United States Patent [19]
Foo et al.

[11] Patent Number: 6,101,097
[45] Date of Patent: *Aug. 8, 2000

[54] POWER SUPPLY ATTACHMENTS FOR TOWER COMPUTER ENCLOSURE

[75] Inventors: Khim Foo, Palo Alto; Steven Furuta, Santa Clara, both of Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/890,852

[22] Filed: Jul. 10, 1997

[51] Int. Cl.⁷ .................................. G06F 1/16; H05K 7/10
[52] U.S. Cl. ...................... 361/727; 361/683; 361/725; 312/223.1; 312/223.2
[58] Field of Search ..................... 361/727, 725, 361/724, 686; 312/223.1, 223.2

[56] References Cited

U.S. PATENT DOCUMENTS

| | | | |
|---|---|---|---|
| 4,498,123 | 2/1985 | Fuss et al. | 361/725 |
| 4,739,445 | 4/1988 | Tragen | 361/725 |
| 4,977,532 | 12/1990 | Borkowicz et al. | 361/686 |
| 5,121,296 | 6/1992 | Hsu | 361/725 |
| 5,124,885 | 6/1992 | Liu | 361/724 |
| 5,136,468 | 8/1992 | Wong et al. | 361/725 |
| 5,159,528 | 10/1992 | Murphy | 361/724 |
| 5,172,305 | 12/1992 | DeWilde | 361/725 |
| 5,175,670 | 12/1992 | Wang | 361/724 |
| 5,392,192 | 2/1995 | Dunn et al. | 361/727 |
| 5,397,176 | 3/1995 | Allen et al. | 312/223.2 |
| 5,450,285 | 9/1995 | Schlemmer | 361/724 |
| 5,460,441 | 10/1995 | Hastings et al. | 361/727 |
| 5,587,887 | 12/1996 | Ryan et al. | 361/724 |
| 5,593,219 | 1/1997 | Ho | 361/724 |
| 5,612,854 | 3/1997 | Wiscombe et al. | 361/727 |
| 5,673,174 | 9/1997 | Hamirani | 361/686 |
| 5,754,396 | 5/1998 | Felcman et al. | 361/725 |

FOREIGN PATENT DOCUMENTS

| | | |
|---|---|---|
| 0 425 183 | 5/1991 | European Pat. Off. . |
| 0 428 273 | 5/1991 | European Pat. Off. . |
| 0 836 134 | 4/1998 | European Pat. Off. . |
| WO 96 35160 | 11/1996 | WIPO . |

*Primary Examiner*—Leo P. Picard
*Assistant Examiner*—Lisa Lea-Edmonds
*Attorney, Agent, or Firm*—Conley, Rose & Tayon, PC; B. Noel Kivlin

[57] ABSTRACT

A tower-type computer power supply is supported from the top of the chassis by tracks so that it may be slid horizontally outward of the back of the chassis. A motherboard is vertically supported between the power supply and a vertical side of the computer. Upon sliding the power supply outwardly to a position where it is still supported by the tracks, the power supply cables may be plugged into the motherboard. When the cables are so connected, they limit outward movement of the power supply. When the power supply is moved inward, the cables are concealed behind the power supply. Outward movement also provides access to sockets on the motherboard for installation or removal of DSIMMs (such as memory cards).

17 Claims, 2 Drawing Sheets

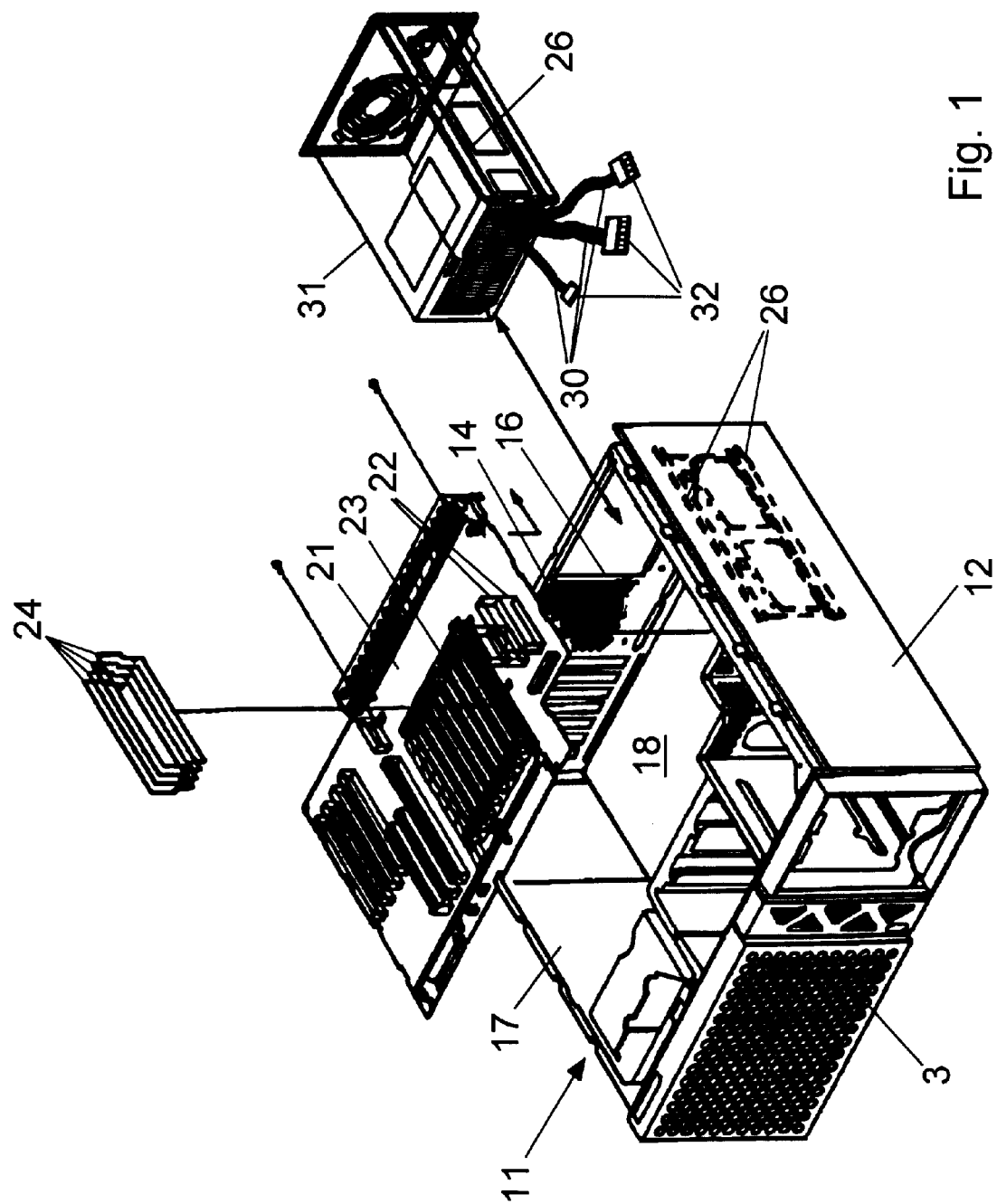

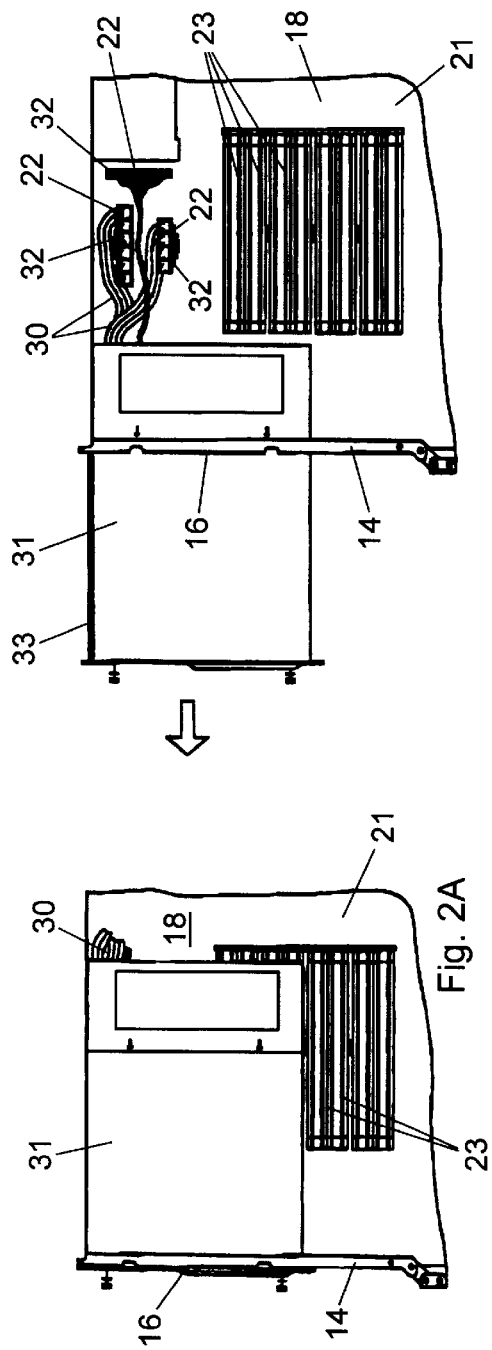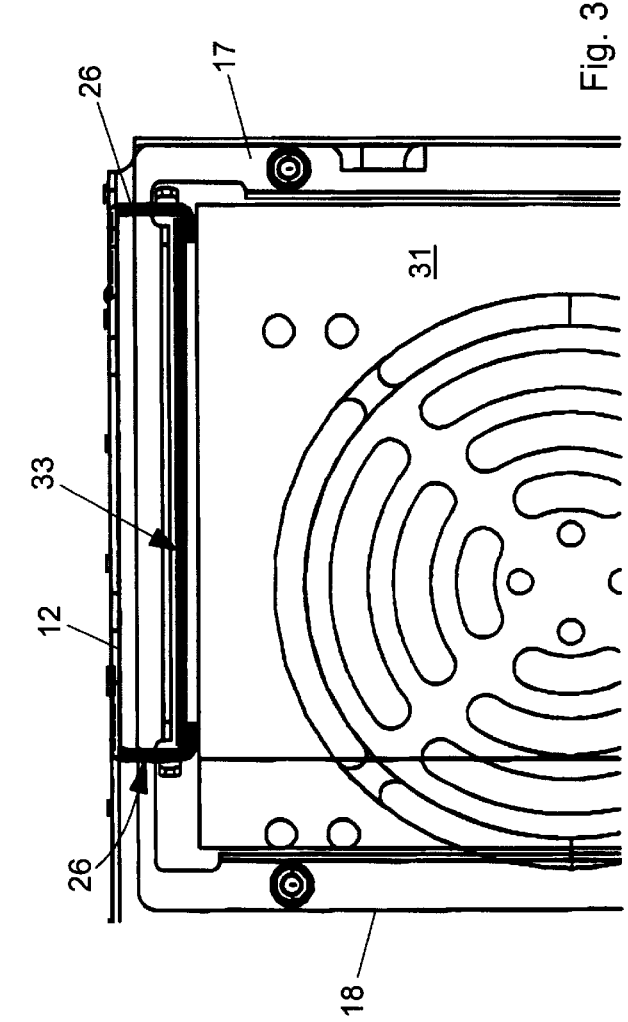

POWER SUPPLY ATTACHMENTS FOR TOWER COMPUTER ENCLOSURE

BACKGROUND OF THE INVENTION

1. Field of the Invention

This invention relates to a new and improved power supply attachment for a tower-type computer housing. More particularly the invention relates to the mounting of a power supply module by means of tracks to interengaging tracks on the underside of the top of a computer chassis. When the power supply is slid outwardly through the back of the chassis to a retracted position, the power supply cables may be inserted in/or removed from sockets in the motherboard of the computer. Further, in the retracted position some of the sockets for Dual Single Inline Memory Modules (herein "DSIMMs") (such as memory cards) are exposed for insertion and removal of cards.

2. Description of Related Art

Industry standards for tower-type computers require that the power supply be mounted in the top of the tower. Heretofore such power supplies have obscured a part of the computer motherboard. By mounting the power supply on rails, the power supply may be slid partially out of the back of the chassis, exposing sockets for the power supply cables and also exposing some of the sockets for cards such as DSIMMs. This accomplishes more effective space utilization.

SUMMARY OF THE INVENTION

A chassis for a tower-type computer is provided with an open left side which is normally closed by a cover. There is a hole provided in the back of the chassis large enough for the power supply to be inserted therethrough or slid outwardly therefrom. The power supply has rails on its upper surface and there are corresponding rails on the underside of the top of the chassis. When the power supply is slid outwardly so that it is almost entirely removed from the chassis, the motherboard is exposed. Cables of the power supply have plugs which are inserted in sockets in the motherboard so that the plugs may be unplugged or installed. Further, when the power supply is slid to its outward position some sockets for DSIMMS are exposed. Thus DSIMMS may be inserted and removed from such sockets.

When the power supply is slid back into the housing, the flexible, soft cables are tucked between the power supply and the motherboard where they do not interfere with other components in the enclosure. When required, the power supply may be totally removed by disconnecting the cable connectors from the motherboard. Unless these connectors are unplugged, the length of the cable limits the outward movement of the power supply on its tracks.

The chassis is metallic and the power supply has a metallic outer end for Electromagnetic Interference Compatability or Compliance (herein "EMI") shielding of the computer.

The power supply is locked in place by four captive screws. In the event of service or other access to the motherboard, the power supply needs to be removed. The power supply may be slid outwardly of the chassis once its cables have been unplugged.

The slides by which the power supply is supported are simple channel rails which are self-lubricating and are weighted by the power supply.

Air intake into the power supply must be efficient so as to ensure the high power components remain cool and operating. Accordingly the cables branching out from the power supply are bundled and looped so that the ventilation holes are not obstructed.

BRIEF DESCRIPTION OF THE DRAWINGS

The accompanying drawings, which are incorporated in and form a part of this specification, illustrate embodiments of the invention and, together with the description serve to explain the principles of the invention.

FIG. 1 is an exploded perspective view of components of a tower-type computer with the computer rotated 90° so that it is resting on its right side.

FIG. 2A is a fragmentary side elevational view showing the power supply in its inward position.

FIG. 2B is a view similar to FIG. 2A showing the power supply partly slid out through an opening in the back of the chassis of the computer.

FIG. 3 is a fragmentary rear elevational view.

DESCRIPTION OF THE PREFERRED EMBODIMENT

Reference will now be made in detail to the preferred embodiment of the invention, examples of which are illustrated in the accompanying drawings. While the invention will be described in conjunction with the preferred embodiment, it will be understood that they are not intended to limit the invention to those embodiment. On the contrary, the invention is intended to cover alternatives, modifications and equivalents, which may be included within the spirit and scope of the invention as defined by the appended claims.

A tower-type computer chassis 11 is illustrated in FIG. 1 shown on its right side. Such a chassis 11 has a top 12, front 13 and back 14. Back 14 is formed with a rectangular opening 16 for insertion and removal of a power supply. As shown in FIG. 1 the left side 17 of the chassis is removed and the right side 18 is exposed.

Motherboard 21 is shaped to be attached to right side 18 by captive screws. The motherboard 21 is subject to considerable variation in its components. As illustrated herein, there are three sockets 22 for complementary plugs 32 of the cables of the power supply unit 31. The motherboard also contains sockets 23 for DSIMMs such as memory cards, some of which are located near the top of the motherboard where they are concealed by the power supply unit 31 when in "inward" position. When the power supply unit 31 is removed or slid outwardly to a retracted position (as hereinafter described) some of the sockets 23 which would otherwise be concealed are exposed for insertion and removal of cards 24. Furthermore, the sockets 22 are behind the power supply unit 31 when it is in fully inserted position. On the underside of top 12 are channel-shaped rails 26.

Power supply unit 31 may be of a number of different constructions. Industry standards prefer that such units be installed at the top of the tower and hence the bulk and weight of the unit interferes with access to the motherboard 21. Cables 30 having cable plugs 32 are provided extending from the inside of the unit. Such plugs 32 may be inserted in the sockets 22 when the motherboard is installed and the unit 31 is in retracted position. Track 33 on the top of the unit 31 interengages with rails 26 so that the unit may be slid from its fully in position shown in FIG. 2A to its retracted position shown in FIG. 2B. The cables 30 limit the outward movement of the unit 31. If the plugs 32 are disconnected from the motherboard, then the unit 31 may be fully removed from the chassis. When the plugs 32 are inserted in the sockets 22 and the unit 31 is slid into the chassis, the cables 30 are tucked between the unit 31 and the motherboard 21 where they are out of the way and do not interfere with functioning of the other components attached to the motherboard (FIG. 2A).

When the unit 31 is in the position shown in FIG. 2B access to the sockets 23 is provided and certain repair and maintenance functions may be performed. In order to remove the motherboard 21, however, the unit 31 must be fully withdrawn.

The foregoing descriptions of a specific embodiment of the present invention have been presented for purposes of illustration and description. They are not intended to be exhaustive or to limit the invention to the precise forms disclosed, and obviously many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A power supply computer construction comprising:
   a computer chassis comprising a first side, back, front, first top having an underside and bottom, a detachable second side opposite to said first side, said back being formed with an opening;
   a motherboard attached to said first side;
   a power supply unit casing parallel to and spaced laterally from said motherboard, said power supply unit casing having a second top; and
   first tracks fixed to said underside of said first top and second tracks fixed on top of said second top interengaging said first tracks suspending said power supply unit from said first top whereby said power supply unit may be moved from a first position within said chassis through said opening to a second position at least partially retracted from said chassis, said first tracks being fixed to said first top such that the first and second tracks are substantially in fixed alignment,
   whereby when said second side is detached and said power supply unit is in aid second position, unobstructed access is provided to said motherboard.

2. A power supply according to claim 1 in which said power supply unit has at least one power cord having a first connector and said motherboard has a second connector detachable engaging said first connector, said power cord having a length to restrain outward movement of said power supply unit beyond said second position.

3. A power supply according to claim 2 in which said power supply unit may be removed from engagement with said chassis by disengaging said connectors and withdrawing said power supply unit beyond said second position.

4. A power supply according to claim 2 in which said power cord is stored between said motherboard and said power supply unit when said power supply unit is in said first position.

5. A power supply according to claim 1 in which said motherboard is provided with a socket for at least one DSIMM, said socket being exposed when said power supply unit is in said second position and concealed when in said first position.

6. A power supply according to claim 1 in which said chassis is electrically conductive and said power supply unit has an electrically conductive outer end for EMI shielding of said computer.

7. A housing for a computer system, the housing comprising:
   a chassis comprising a first side, back, front, top having an underside, bottom and a detachable second side opposite to said first side, said back being formed with an opening;
   mountings for attaching a motherboard to said first side; and
   a power supply unit, a mounting structure for mounting said power supply unit spaced from said motherboard, said mounting structure including first tracks fixed to said underside of said top of said chassis for interengaging with second tracks fixed to a top of said power supply unit for suspending said power supply unit under said top of said chassis such that said power supply unit may be moved from a first position within said chassis through said opening to a second position at least partially retracted from said chassis, said first tracks being fixed to said underside of said first top such that the first and second tracks are substantially in fixed alignment,
   whereby when said power supply unit is in said second position and said second side is detached, unobstructed access is provided to said motherboard.

8. A housing for a computer system according to claim 7, in which said power supply unit has at least one power cord having a first connector and said motherboard has a second connector detachable engaging said first connector, said power cord having a length to restrain outward movement of said power supply unit beyond said second position.

9. A housing for a computer system according to claim 8, in which said power supply unit may he removed from engagement with said chassis by disengaging said connectors and withdrawing said power supply unit beyond said second position.

10. A housing for a computer system according to claim 7, in which said motherboard is provided with a socket for at least one DSIMM, said socket being exposed when said power supply unit is in said second position and concealed when in said first position.

11. A computer comprising:
    an enclosure having a first top with a lower surface, and a wall with an opening extending therethrough;
    a power supply comprising a second top with an upper surface;
    a first pair of tracks fixed to the lower surface of the first top and a second pair of tracks fixed to the upper surface of the second top, the first pair of tracks interengaging with the second pair of tracks to suspend the power supply from the first top,
    whereby the power supply is capable of being moved from a first position within the enclosure through the opening to a second position at least partially withdrawn from the enclosure; and
    in which the power supply is substantially enclosed by a casing, and wherein the casing has at least one electrically conductive surface to reduce electromagnetic interference with components in the computer caused by electrical current within the power supply.

12. A computer according to claim 11 further comprising at least one cable coupling the power supply to the computer, the cable having a length adapted to restrain movement of the power supply beyond the second position.

13. A computer according to claim 12 wherein the cable has a first connector and the power supply has a second connector detachable engaging the first connector, and wherein the power supply is adapted to be removed from the enclosure by disengaging the first and second connectors and by moving the power supply beyond the second position.

14. A computer according to claim 12 wherein the cable comprises a power cord coupling the power supply to a board in the computer.

15. A computer according to claim 14 wherein the enclosure further comprises a fixed sidewall to which the board is attached, and a detachable sidewall opposite the fixed sidewall, and wherein when the power supply is adapted to provide substantially unobstructed access to the board when in the second position.

16. A computer according to claim 14 wherein the board further comprises at least one socket adapted to receive an electronic module, and wherein the socket is accessible when the power supply is in the second position and inaccessible when the power supply is in the first position.

17. A computer according to claim 14 wherein the board comprises a surface that is parallel to and spaced apart from the power supply, and wherein the power cord is stored between the board and the power supply when the power supply is in the first position to reduce electromagnetic interference with components in the computer caused by electrical current passing through the power cord.

* * * * *

UNITED STATES PATENT AND TRADEMARK OFFICE
CERTIFICATE OF CORRECTION

PATENT NO. : 6,101,097

DATED : August 8, 2000

INVENTOR(S) : Khim Foo and Steven Furuta

It is certified that error appears in the above-identified patent and that said Letters Patent is hereby corrected as shown below:

Claim 1, col. 3, line 43, please change "aid" to "said".

Signed and Sealed this

Tenth Day of April, 2001

Attest:

NICHOLAS P. GODICI

Attesting Officer     Acting Director of the United States Patent and Trademark Office